Jan. 23, 1951   W. H. COLES   2,539,061
SPRAY NOZZLE
Filed May 14, 1948
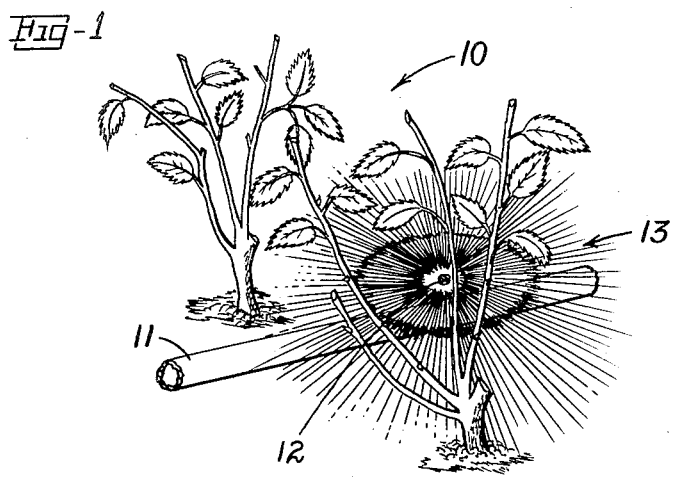
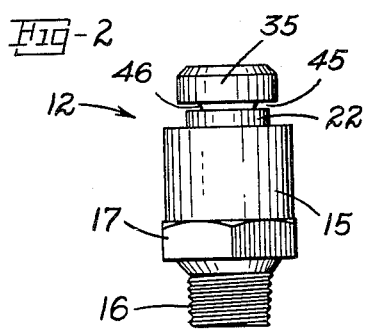
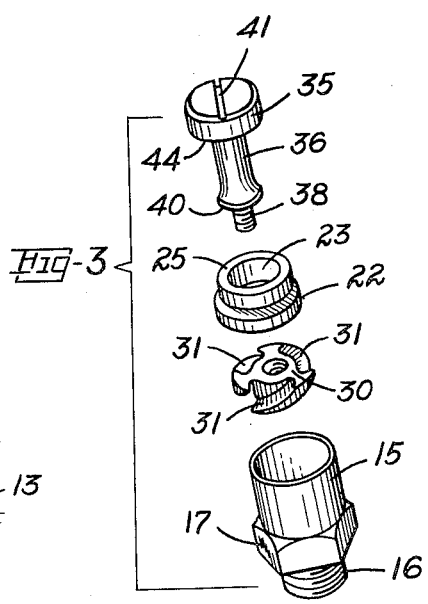
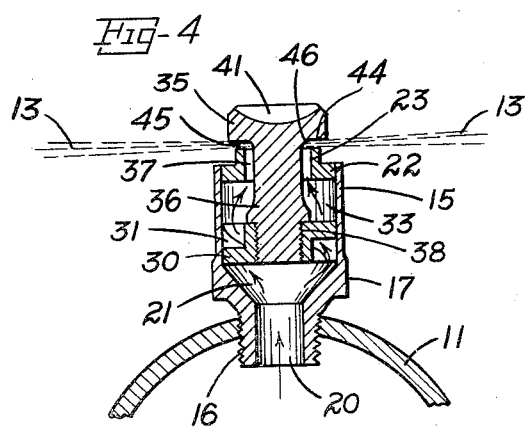
INVENTOR.
Walter H. Coles
BY
Marechal & Biebel
ATTORNEYS Patented Jan. 23, 1951

2,539,061

UNITED STATES PATENT OFFICE 2,539,061

SPRAY NOZZLE

Walter H. Coles, Troy, Ohio, assignor to The Skinner Irrigation Company, Troy, Ohio, a corporation of Ohio Application May 14, 1948, Serial No. 27,092

5 Claims. (Cl. 299—121)

This invention relates to spray nozzles for distributing water over growing plants.

The invention has particular application to spray nozzles adapted to be positioned in close proximity to the ground for discharging a generally radial spray which will remain below the level of the upper portions of the plants, and one of the principal objects of the invention is to provide such a spray nozzle of simp'e construction for discharging a substantially flat circular spray producing a substantially uniform pattern of distribution over the entire effective range of the nozzle.

Another object is to provide such a spray nozzle having a peripheral discharge slot of narrow vertical dimensions to give a uniform and fine circular spray and wherein the water is conveyed to the discharge slot through a series of restricted passages each of lesser cross section than the preceding passage to maintain uniform pressure and distribution at the discharge slot.

An additional object is to provide such a spray nozz'e wherein the discharge slot and the smallest of the restricted passages leading thereto are formed by cooperating parts which are readily separable tc effect dislodging of any clogging foreign matter and which are also so constructed and arranged that they are readily returned to accurately located positions for maintaining desired dimensions of the outlet passage and especially of the discharge slot.

It is also an object of the invention to provide such a spray nozzle wherein turbulence or inequa'ities in pressure in the water are corrected within the body of the nozzle to give uniform pressure cross-sectionally of the device as the water approaches the discharge slot and thus to effect uniform spray distribution.

Other objects and advantages of the invention will be apparent from the following description, the accompanying drawing and the appended claims.

In the drawing—

Fig. 1 is a somewhat diagrammatic view in perspective illustrating the operation of a spray nozzle in accordance with the invention;

Fig. 2 is a view in side elevation of a spray nozzle in accordance with the invention for producing a spray pattern as illustrated in Fig. 1;

Fig. 3 is an exploded perspective view of the nozzle of Fig. 2; and

Fig. 4 is a view in vertical section of the nozzle of Fig. 2.

The present invention provides a nozzle which has been found particularly suitable for use in watering beds of growing plants such, for example, as in greenhouses. For such uses a high degree of uniformity of water distribution is desirable in order to promote uniform growth and root formation, and also the spray should be sufficiently fine to permit discharge at a pressure high enough to cover an adequate range without generating forces capable of injuring the plants. The invention provides a spray nozzle which is adapted to be mounted in vertical position relatively near the level of the ground of the plant bed and which will discharge a flat, completely circular sheet of spray of substantially uniformly thin cross section in a generally horizontal plane below the upper parts of the plants. Since this spray is of thin and flat cross section, inequalities therein would be quite evident, and the invention accordingly provides both for correcting irregularities in pressure capable of affecting the desired uniform discharge and also for quick and easy cleaning of the nozzle to eliminate solid particles tending to obstruct the free flow of water to and through the discharge slot.

In the drawing, which illustrates a preferred embodiment of the invention, Fig. 1 shows somewhat diagrammatically a portion of a plant bed containing growing plants indicated generally at 10, the plants growing in a bed, or in flats, pots or any other desired manner. A water supply pipe 11 extends through the bed along the surface of the ground, and a spray nozzle 12 is mounted in the upper surface of pipe 11 in position to discharge a generally flat circular spray 13. This spray thus gives a substantially uniform distribution of water over a desired area of the plant bed, and since it is in a horizontal plane relatively close to the ground, it produces a desired soaking of the ground and the roots of the plants therein without contact with the upper parts of the plants.

Figs. 2 to 4 show in detail the construction of a spray nozzle in accordance with the invention for producing a spray pattern as shown at 13 in Fig. 1. The main body of the nozzle is a hollow shell 15 having a cylindrical upper portion and a threaded lower end 16 for screwing into a supply pipe to support the shell in vertical position, an intermediate hexagonal portion 17 being provided to facilitate installation. The threaded portion 16 of the shell encloses an inlet passage 20 of restricted dimensions, for example a diameter of 7/32 inch, from which a flaring throat portion 21 leads to the interior of the shell.

An annular collar 22 is press fitted in the upper end of shell 15 and has a central bore 23 of substantial length, for example ¼ inch. The upper portion of collar 22 is of lesser outer diameter than the lower portion of the collar and presents an annular shoulder 25 at its upper ends. Within shell 15 is a disk 30 positioned between the inlet passage 20 and collar 22, disk 30 having helically arranged slots or water distributing flow passages 31 in its outer periphery. The disk 30 is press fitted within shell 15 adjacent the upper end of the throat portion 21 to leave a chamber 33 of substantial volume adjacent the collar 22, the slots 31 forming passageways for water from inlet 20 and throat 21 to the chamber 33.

A deflector member or stud having a head portion 35 includes an elongated stem 36 of lesser diameter than the bore 23 and receivable therein to leave an annular clearance shown at 37 which serves as the outlet passageway from chamber 33. The lower end of stem 36 is threaded at 38 for engagement within the tapped central bore of disk 30 to secure deflector 35—36 to the body of the nozzle. The stem 36 is formed with a shoulder 40 adjacent its threaded end 38 which is adapted to seat on the upper surface of disk 30 but is of such size that it can be withdrawn through passageway 37. A slotted kerf 41 is provided in the upper end of head 35 to receive a screw driver for facilitating assembly and disassembly of these parts.

The deflector head 35 is of greater diameter than shoulder 25 on collar 22, and its undersurface forms a circumferential shoulder 44 which thus overlies the outer end of passageway 37 to define with shoulder 25 a peripheral discharge slot 45 from passageway 37 and the interior of the shell. The discharge slot 45 is restricted to give desired thin cross-sectional dimensions to the spray from the nozzle, satisfactory results having been obtained with a spacing of the order of .020 inch between shoulders 25 and 44. The spacing of the shoulders 25 and 44 is predetermined to assure that the discharge slot 45 is the most restricted of the series of restricted passages through which the water passes in traversing the nozzle.

The water first enters the nozzle through the restricted inlet passage 20 and then passes through the throat portion 21 to the passageways formed by the slots 31 in disk 30, the aggregate cross sectional area of these slots being less than the area of inlet passage 20. The water as it leaves passages 31 has a swirling motion which continues into the enlarged chamber 33, which is of sufficient volume to cause the balancing of pressures and the overcoming of excessive turbulence in the water, thus establishing equilibrium conditions transversely of the nozzle as the water enters the annular passageway 37. As the water enters this passageway, which together with the discharge slot 45 is still more restricted than the preceding passages, the velocity of flow is materially increased and uniform pressure is maintained on the water passing therethrough. The water is then caused to execute a substantially right angled turn as it discharges through slot 45, the junction of shoulder 44 and stem 36 being curved as indicated at 46 to prevent undesirable turbulence at this point.

It has been found that maximum uniformity of spray pattern and distribution is obtained with this construction and arrangement of alternate chambers and restricted passages within the nozzle, with the outlet from each chamber being of lesser area than the inlet thereto. Thus the aggregate area of the passageways formed by the slots 31 is less than the area of the inlet passage 20, and the outlet passageway 37 from chamber 33 is similarly of lesser area than the aggregate area of slots 31 which deliver the water to chamber 33. In tests with this nozzle constructed as shown and of the relative dimensions indicated, it has been found that substantially uniform distribution of water is obtained over a complete circle ranging from 4 to approximately 8.5 feet in diameter for a water pressure in the supply pipe ranging from 2.5 to 30 pounds per square inch, with the total amount of water varying in accordance with the pressure over a range of approximately .8 to 1.8 gallons per minute.

This construction and arrangement of the component parts of the nozzle also facilitates cleaning and reestablishing of the proper relative spacings. For uses such as in greenhouses, the water supply may often not be of perfect clarity and freedom from sand and other particles of solid matter, and since the discharge passages of the nozzle are of such small dimensions, clogging may result. Such clogging will be readily apparent upon inspection because it will produce obvious irregularities in a spray pattern of the fine dimensions provided by this nozzle. In such event, the deflector 35—36 is quickly and easily unscrewed and thereby loosened or removed, thus permitting the pressure to blow out the clogging matter, and as easily replaced in the same position to give the same accurate spacing of the discharge slot.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A spray nozzle of the character described for discharging a substantially flat circular spray of thin cross-section comprising a shell having an inlet passage at one end thereof, means at the opposite end of said shell forming an outlet passage of substantial length having a transverse annular shoulder surrounding the outer end thereof, a flow distributing disk having liquid flow passages therein fixed within said shell in spaced relation to said outlet passage to leave a chamber of substantial volume adjacent said outlet passage, said flow passages connecting said inlet passage with said chamber, a deflector member including a head spaced from and overlying said outlet passage and an elongated stem having a smooth outer surface, said stem being of smaller diameter than said outlet passage and being receivable therein to leave an annular outlet passageway of substantially cylindrical shape and of restricted cross-sectional area, the surface of said head extending outwardly at substantially right angles to said passageway and being joined to said stem by a smooth radius curve, and means for securing said stem to said disk to position said head in predetermined spaced relation with said annular shoulder to form therewith a peripheral discharge slot of predetermined restricted cross-sectional area less than said inlet passage through which water is discharged in said substantially flat spray, the aggregate cross-sectional area of said flow passages in said disk being less than said inlet passage and greater than said discharge slot to provide for uniform pressure on water discharged through said outlet passageway and discharge slot.

2. A spray nozzle of the character described for discharging a substantially flat circular spray of thin cross-section comprising a shell having an inlet passage at one end thereof, means at the opposite end of said shell forming an outlet passage of substantial length having a transverse annular shoulder surrounding the outer end thereof, a flow distributing disk having liquid flow passages therein fixed within said shell to provide a plurality of restricted passageways between said inlet and said outlet passages, a deflector member including a head spaced from and overlying said outlet passage and an elongated stem having a smooth and substantially cylindrical outer surface, said stem being of smaller diameter than said outlet passage and being receivable therein to leave an annular outlet passageway of substantially cylindrical shape and of restricted cross-sectional area, the surface of said head extending upwardly at substantially right angle to said passageway and being joined to said stem by a smooth radius curve, and means for securing said stem to said shell in fixed relation to said shell with said head in predetermined limited spaced relation with said annular shoulder to form therewith a peripheral discharge slot of predetermined restricted cross-sectional area less than said inlet passage to maintain said substantially flat spray in substantially uniform thin section, the aggregate cross-sectional area of said flow passages in said disk being less than said inlet passage and greater than said discharge slot to provide for progressive throttling of the water traversing said nozzle effective to maintain substantially uniform pressure throughout the peripheral length of said discharge slot on the water discharged therethrough.

3. A spray nozzle of the character described for discharging a substantially flat circular spray of thin cross-section comprising a shell having an inlet passage at one end thereof, means at the opposite end of said shell forming an outlet passage of substantial length, a flow distributing disk having liquid flow passages therein fixed within said shell between said inlet and said outlet passages, said flow passages being of aggregate cross-sectional area less than said inlet passage, said disk being spaced axially from said outlet passage to provide a chamber therebetween of substantial volume for establishing equilibrium in the flow of water from said flow passages to said outlet passage, a deflector member including a head spaced from and overlying said outlet passage and an elongated stem, said stem being of smaller diameter than said outlet passage and being receivable therein to leave an annular outlet passageway of substantially cylindrical shape and of restricted cross-sectional area, the surface of said head adjacent said stem forming a circumferential shoulder overlying said outlet passageway, the surface of said stem being smooth to prevent disturbance in the water discharged through said passageway and means for securing said stem to said shell with said head in predetermined limited spaced relation with the outer end of said outlet passage to form a peripheral discharge slot, said shoulder extending substantially at right angles to said outlet passageway to deflect the water into a substantially flat spray around the entire circumferential extent of said nozzle, said discharge slot being of less cross-sectional area than the aggregate area of said flow passages in said disk, said deflector member including a short curved portion between said shoulder and said stem for preventing undesirable disturbance in said spray, said securing means being readily detachable for effecting removal of said deflector member and cleaning of said shell.

4. A spray nozzle of the character described for discharging a substantially flat circular spray of thin cross-section comprising a shell having an inlet passage at one end thereof, an annular collar secured to the opposite end of said shell and having a central bore, a slotted member fixed within said shell in predetermined spaced relation to said collar to define therebetween a chamber of substantial volume, the slots in said slotted member being of generally helical shape and being spaced angularly about the outer periphery of said member to form passageways connecting said inlet passage with said chamber, a deflector member including a stem of smaller diameter than said bore and a head of larger diameter than said bore, said stem being receivable in said bore to leave an annular passageway of substantially cylindrical shape and of restricted cross-sectional area, the surface of said head extending outwardly at substantially right angles to said passageway and being joined to said stem by a smooth radius curve, the adjacent surfaces of said head and said collar forming a peripheral discharge slot for said annular passageway, said stem having a threaded end portion for removably securing said deflector member to said slotted member, said stem including a shoulder adjacent said threaded portion adapted to abut said slotted member to position said head in predetermined limited spaced relation with said collar restricting the cross-sectional area of said discharge slot to less than said inlet passage such that water is discharged therethrough at substantially right angles to its direction of flow through said annular passageway, the aggregate cross-sectional area of said slots in said slotted member being less than said inlet passage and greater than said discharge slot to provide for uniform pressure on water discharged through said annular passageway and said discharge slot.

5. A spray nozzle of the character described comprising a shell forming a substantially cylindrical water chamber, said shell including a threaded inlet portion provided with an inlet passage and adapted for attachment to a supply pipe to support said shell in vertical position, means within said shell adjacent said inlet portion forming a plurality of connecting passages from said inlet passage to said chamber to establish uniform pressure within said chamber, the total cross-section of said passages being less than the cross-section of said inlet passage, means forming an outlet from said chamber and coaxial therewith, a stud including a head portion larger in diameter than said outlet and a stem portion adapted for insertion within said outlet to form therewith a substantially cylindrical annular outlet passage from said chamber, means for securing said stud to said shell to position the head of said stud in spaced relation with the outer end of said shell to provide between said head and said shell a substantially horizontal circular discharge slot of predetermined dimensions smaller in cross-section than the total cross-section of said connecting passages, said head portion of said stud forming a shoulder spaced from and adapted to overlie said outlet passage and extending substantially at right angles to said passage to deflect the water discharged through said passage into a substantially flat spray, and said stud also including a short curved portion between said shoulder and said stem to reduce disturbance in the water discharged from said nozzle.

WALTER H. COLES.

REFERENCES CITED

The following references are of record in the file of this patent:

UNITED STATES PATENTS

| Number | Name | Date |
|---|---|---|
| 949,360 | Kinealy | Feb. 15, 1910 |
| 1,223,081 | Lissauer | Apr. 17, 1917 |
| 1,296,542 | McConnell | Mar. 4, 1919 |
| 2,048,125 | Irving et al. | July 21, 1936 |
| 2,332,350 | Scritchfield | Oct. 19, 1943 |